Sept. 25, 1956
E. E. SHELDON
2,764,148
ENDOSCOPE MEANS FOR THE INTERNAL EXAMINATION
OF THE HUMAN BODY
Filed July 11, 1950
4 Sheets-Sheet 1
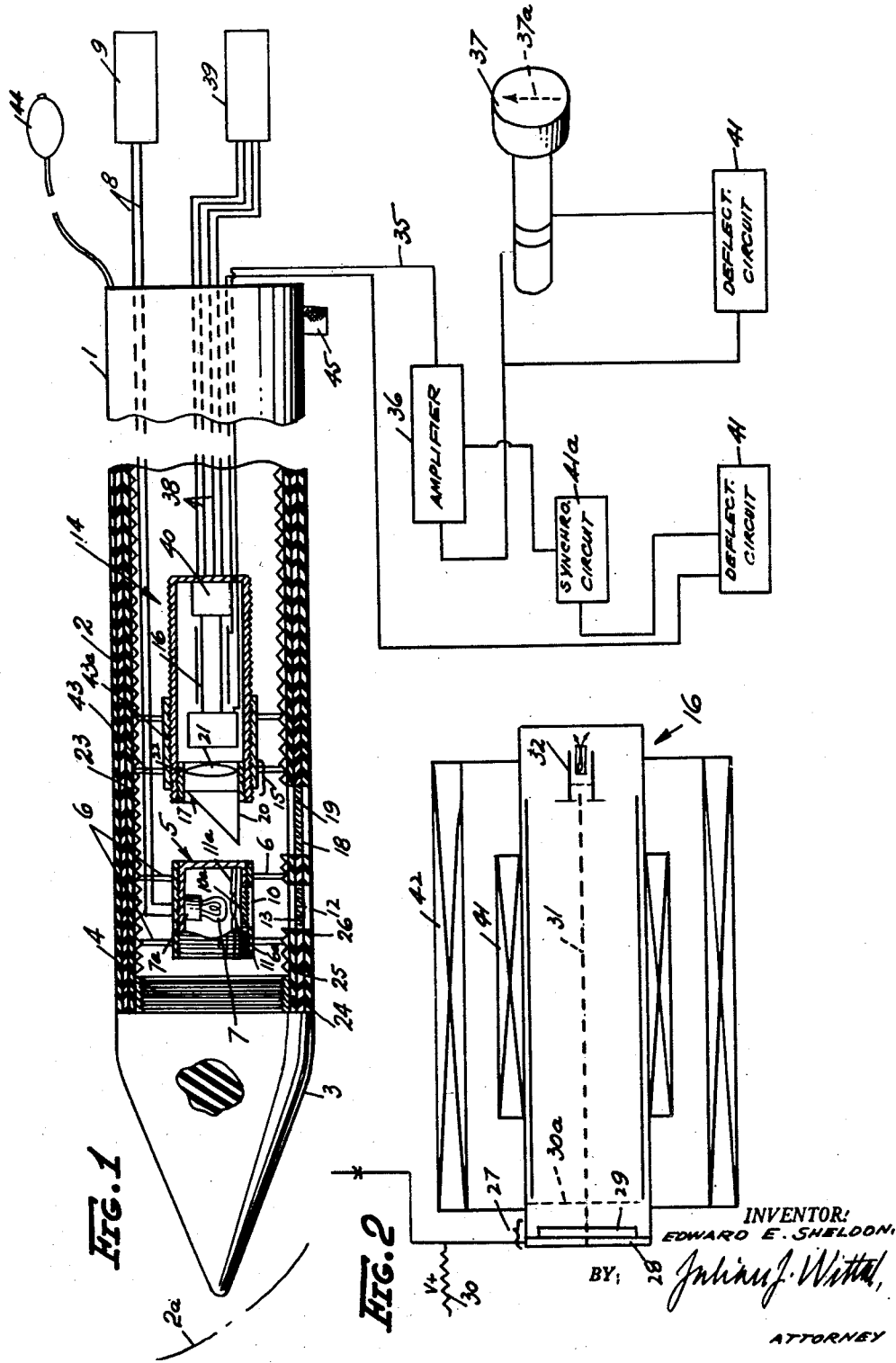
INVENTOR:
EDWARD E. SHELDON,
BY Julius J. Wittel
ATTORNEY

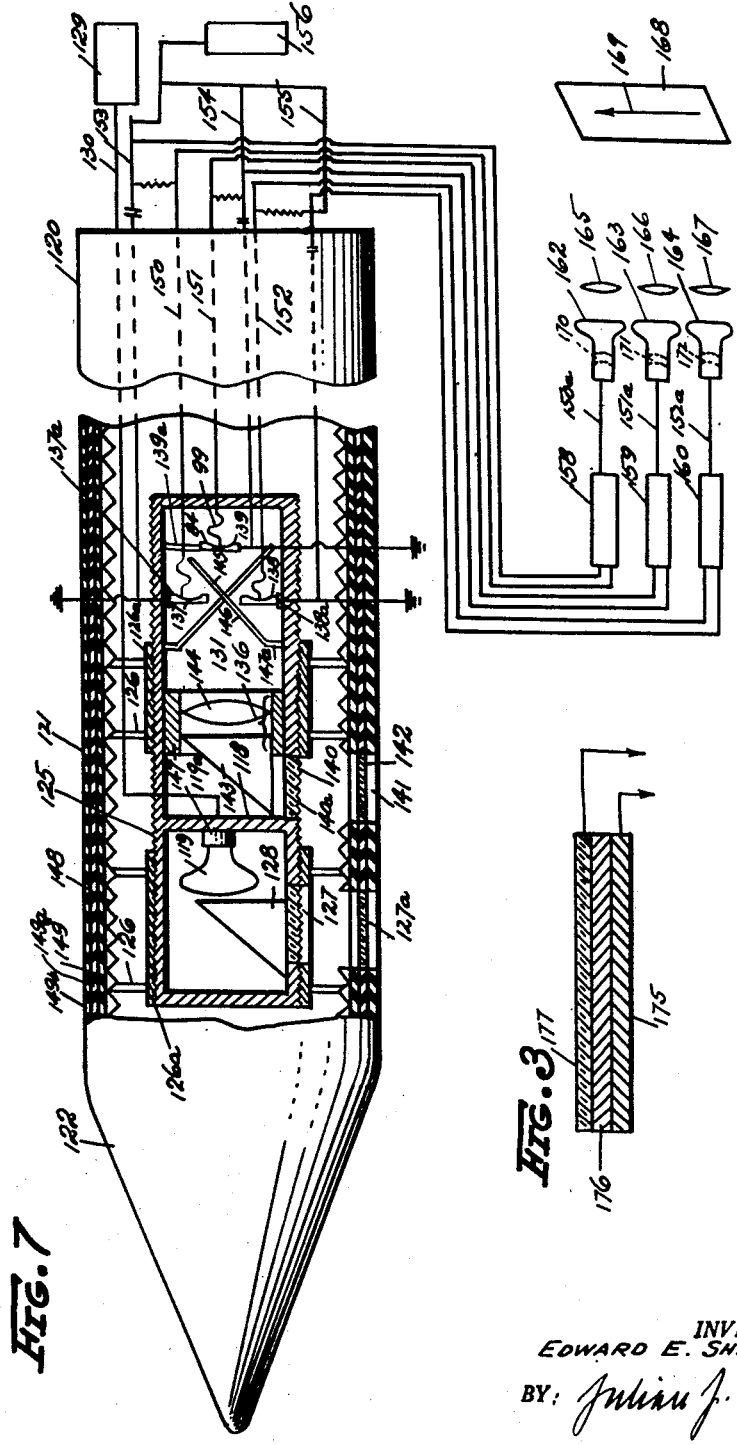

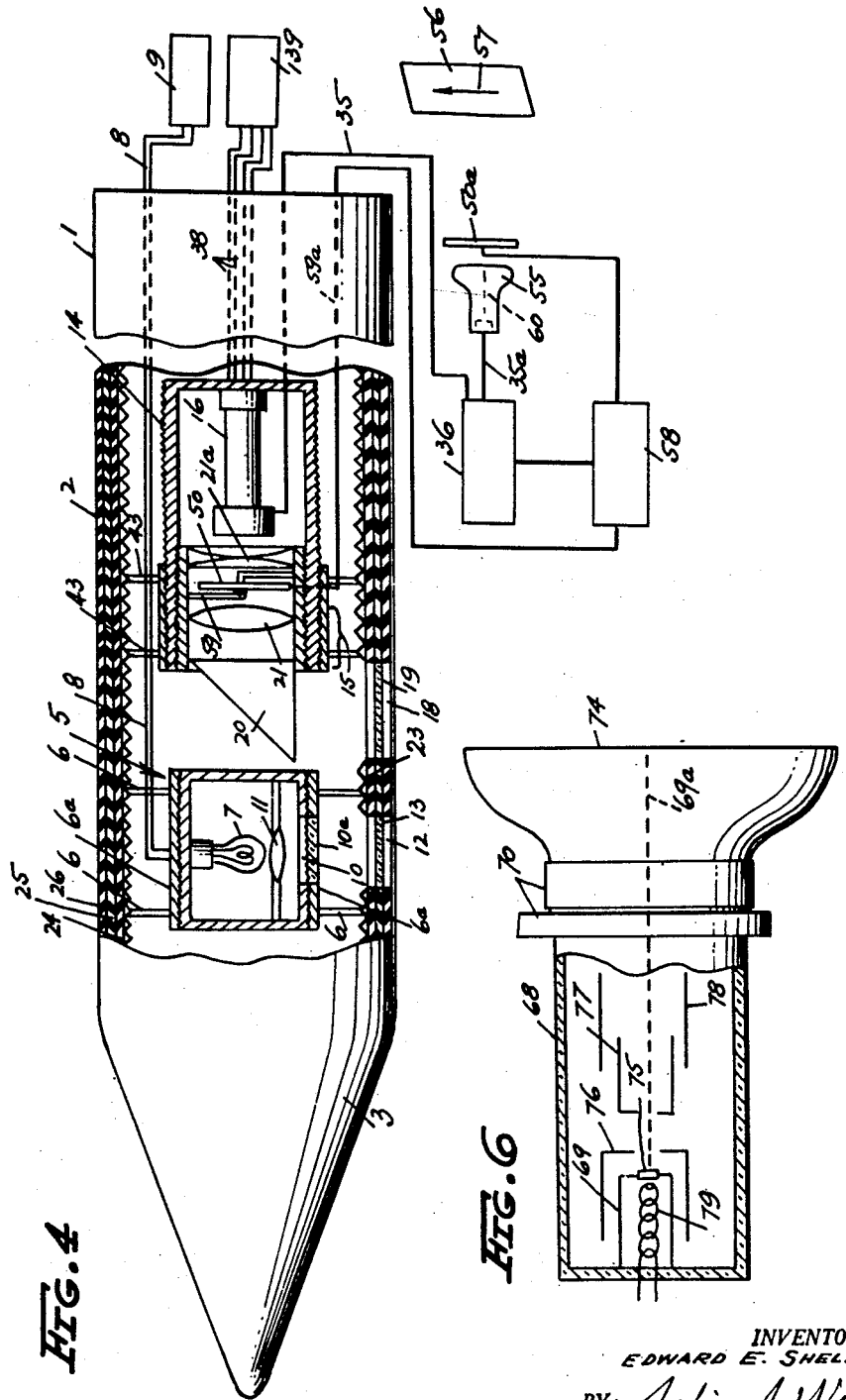

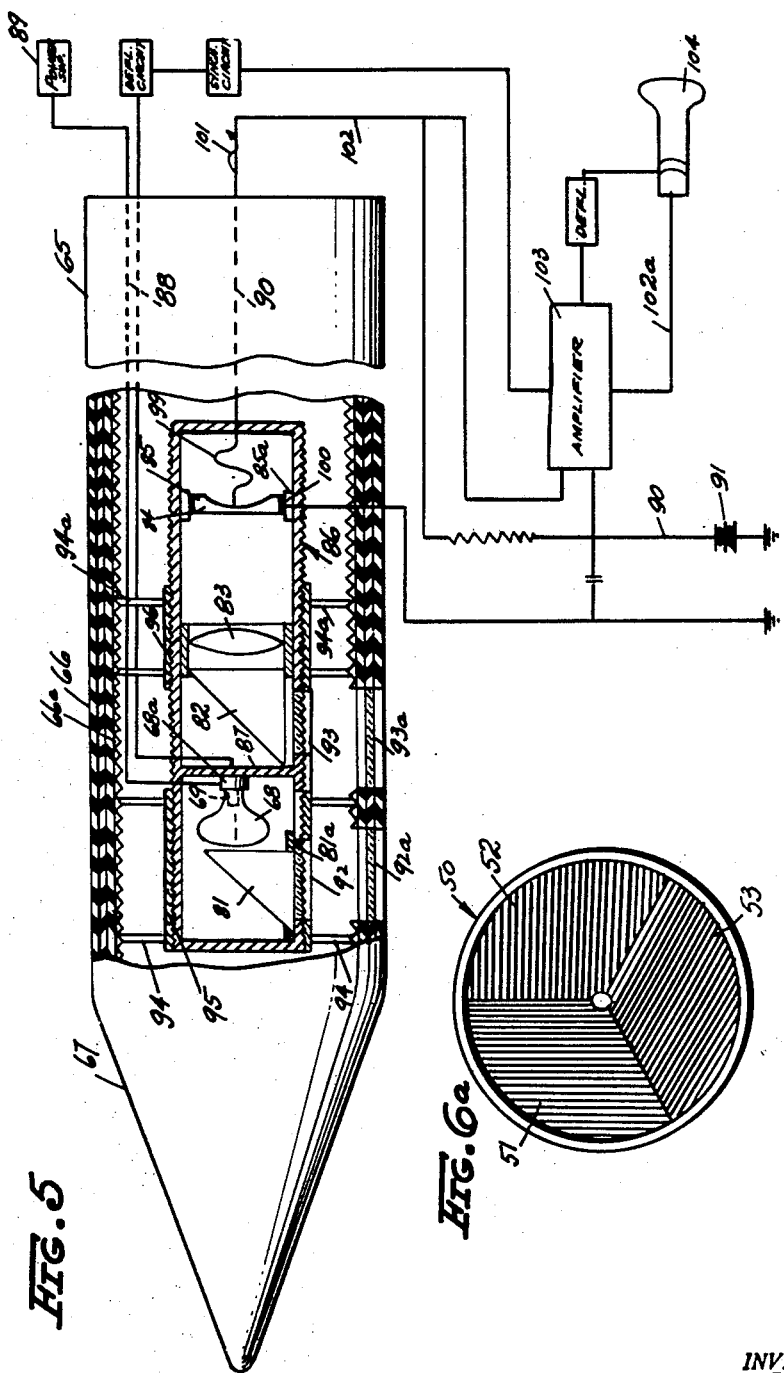

United States Patent Office 2,764,148
Patented Sept. 25, 1956

2,764,148

ENDOSCOPE MEANS FOR THE INTERNAL EXAMINATION OF THE HUMAN BODY

Edward Emanuel Sheldon, New York, N. Y.

Application July 11, 1950, Serial No. 173,145

7 Claims. (Cl. 128—4)

This invention relates to a novel endoscopic instrument i. e. instrument for examination of the internal organs of the body such as e. g. gastrointestinal tract including oesophagus, stomach, intestine small and large, rectum, pulmonary tract including trachea, bronchi, urinary tract or peritoneal and pleural cavities and has a common subject matter with my co-pending patent application Ser. No. 320,243, filed November 13, 1952. This invention is related to my co-pending applications, Ser. No. 15,222, for Method and Device for Endoscopy, filed March 16, 1948, and now abandoned, and Ser. No. 227,911, for Method and Device for Investigation of Human Bodies, filed May 23, 1951. The present endoscopic devices consist of straight tubes which are either hollow or are provided with lenses or prisms. Due to inability of light to see around the corners, the present endoscopes have to be absolutely straight and rigid so that the eye of the examiner and the examined part of the patient's body are in one straight line. The endoscopes using optical lenses or prisms do not improve this situation as the shape and the size of examined organs is so variable that the position of the curves and angles of the organs is absolutely unpredictable and therefore the lenses or prisms cannot be positioned to anticipate these multiple deviations of the axis of the examined organ from the straight line.

The purpose of my invention is to provide a method and device for visual examination of the internal organs regardless of their size and shape and of the angle of their curvatures which was impossible until now and represents therefore an important process in medical diagnosis.

Another purpose of this invention is to provide means for introduction of the endoscopic instrument into a patient's body under constant visual control which is the most important factor in the safety of performance of endoscopic examination.

Another purpose of my invention is to enable simultaneous observation by many examiners, in close or remote locations, which was not possible until now. This is of great importance as the endoscopic procedures being extremely strenuous for the patient have to be performed very fast so that there is no time available for other examiners to inspect the examined field.

Another purpose of my invention is to provide means for simultaneous visual inspection, and photographic recording of the examined organ which also has never been possible before.

The objectives of my invention were realized by a novel endoscopic system, which after its introduction into the examined part is producing a light image of the examined part, is converting said light image into video signals and then is transmitting said video signals outside of the examined body. Video signals are re-converted in receivers outside of the examined body into visible images for inspection or recording. My endoscopic system can produce black and white images, as well as multi-color images showing faithfully the colors of the examined part.

Another purpose of my invention is to provide means for inspecting inaccessible internal parts of machinery. My device may be introduced at a part which cannot be inspected visually without dismantling or destroying the whole machine, and will transmit the image of said part to the observer outside of said part.

Another objective of my invention is to intensify the image of the examined internal part so that the final image will be presented to the observer with the luminosity facilitating inspection of said image.

Another objective of this invention is to change or amplify the contrast of the image of the examined internal part.

In the drawings:

Fig. 1 represents a partially sectioned view of the endoscope;

Fig. 2 represents a sectional view of the television pick-up tube used in the endoscope illustrated in Fig. 1;

Fig. 3 represents a photovoltaic photocell;

Fig. 4 represents a partially sectioned view of a modification of the endoscope for color image reproduction;

Fig. 5 represents a partially sectioned view of a modification of the endoscope, using flying spot kinescope;

Fig. 6 represents a partially sectioned view of the flying spot kinescope;

Fig. 6a represents an elevational view of the rotating color disc;

Fig. 7 represents a partially sectioned view of the endoscope producing colored images.

The new endoscope is shown in Fig. 1.

The handle 1 is a rigid tube of diameters corresponding to the examined organ 2a of the patient, and serves to move the endoscope into a desired direction. At the end of the handle begins the flexible part 2 of the endoscope which also has the width and length appropriate for the size of the organ being investigated.

The flexible part 2 of the endoscope is made of the stainless steel spiral sheet 23 designed not only for durability but also to maintain the proper degree of flexibility and elasticity. The metal spiral is tapered to insure its uniform bending. The proximal and the distal portions of the spiral are thicker than the mid portion. The spiral is covered with rubber tubing 24 which is again covered with paratubing 25. On the top of the paratubing an outer tubing 26 of neoprene is applied. This prevents dust particles and moisture from affecting the optical and pick-up system located inside of the endoscope. At the end of the flexible part there is a semi-flexible tip 3 which is screwed on the flexible part by means of threads 4 and can be easily removed giving thereby access to the inner structures of the endoscope. The tip consists of a solid rubber conical finger and serves to facilitate the gliding of the endoscope within the examined organ. In order to facilitate the introduction of the endoscope in the parts which have no curves the endoscope can be made semi-rigid by inserting into it a semi-rigid stilet.

In the distal end of the flexible part of the endoscope there is a rigid non-transparent housing box 5 containing the illumination system. The box is attached to the inner walls of the endoscope by means of the brackets 6 and the threaded tube 6a. The brackets are soldered to the inner walls of the endoscope. The brackets 6 support the tube 6a which is threaded in its internal diameter. The housing box has a circular shape, is threaded in its external diameter and is screwed into the tube 6a. This arrangement facilitates proper positioning of the housing box. The housing box is provided with the window 10 having transparent glass 10a for transmission of the light from the illuminating system. This window is correlated with the window 12 in the flexible part of the endoscope which is provided with transparent glass 13 and which transmits the light from the illuminating system to the examined part.

The illuminating system consists of the electrical bulb 7. The electrical bulb is mounted in the housing box 5 by means of a socket 7a. The electrical bulb is fitted into the socket and screwed onto it. The lamp filament is placed to give the maximum intensity of light. In some cases it is advantageous to use the objective lens 11 between the light bulb and window in order to concentrate the light on one field. The lens is held in position by brackets 11a. The light bulb is activated by the source of electrical power 9 situated outside of the examined body. Such a source may be the commercial electrical house current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. In some instances instead of the incandescent light source, a miniature mercury arc is preferable.

In the flexible part 2 proximally to the housing box 5, there is another rigid non-transparent housing compartment 14 containing the optical system 15 and the television pick-up tube 16. The housing 14 has an opening 17 in which the optical system 15 is lodged and which serves to admit the image of the examined part. This opening is correlated with window 18 in the flexible part of the endoscope which is provided with transparent glass 19 and which transmits the image of the examined part. The housing 14 containing the television pick-up system and the optical system is attached to the inner wall of the flexible part 2 of the endoscope by means of brackets 43 and the tube 43a. The brackets are soldered or welded to the inner wall of the endoscope, so that the housing is securely held in a proper position. These brackets support the tube 43a which is threaded in its internal diameter. The housing box 14 has a circular shape, is threaded on its external surface and is screwed into the tube 43a. This arrangement facilitates proper positioning of said housing box.

The optical system consists of 90° gable prism of Amici 20 and of condenser lens 21. This prism is designed not only to pick up the right rays reflected from the walls of the examined organ and to refract them to the condenser lens 21, but also serves to rotate the image to the correct side, i. e. it makes the object to the right of the objective appear to the right in the visual field. The prism 20 and lens 21 are mounted in the cylindrical bracket 22 which is threaded. This bracket is screwed to the aperture 17 provided in the housing box 14, which is threaded for this purpose.

In some cases it is desirable to have a large field of vision and at the same time to preserve the necessary magnification of the examined part. In such a case, instead of the prism 20, a rotating mirror should be used. The mirror has first surface coating, which eliminates the reflections, and is activated by the magnetic solenoid placed beneath the mirror. The solenoid is connected by the elastic cable with the controls outside of the examined body and can tip the mirror from the retrograde position to the forward position giving thereby an additional field of vision without the necessity of moving the endoscope. The image of the examined body 2a is reflected by the mirror on the objective lens which focuses said image on the photocathode of the television pick-up tube as described before. In case the magnification of the examined part is not necessary a large field of vision can be obtained by using the lens providing 80° field of vision instead of the usual 45–50°. The image produced by the optical system 15 is inverted but it can be reverted to the original position either by an additional lens or electron-optically in the viewing tube.

The housing box 14 contains also the miniature television pick-up tube 16. The pick-up tube may be of any type known in the art such as e. g. image dissector, iconoscope, orthicon or image orthicon. In this invention a photoconductive type of pick-up tube is used. This television pick-up tube is shown in detail in Fig. 2 but it obviously does not represent the inventive idea as it is well known in the art. The television pick-up tube is held in the housing 14 by means of the socket 40 mounted in the inner wall of the housing 14. The socket is supplied with multiple flexible wire leads 38 connecting it with the outside source of electrical power 39. The light image of the examined part of the body is projected by the lens 21 on the photoconductive photocathode 27 of the pick-up tube 16. The satisfactory photoconductive materials are selenium, $Cu_2O$, germanium, thallium sulphide and lead sulphide or selenide. Many sulphides, selenides and oxides exhibit strong photoconduction and can be used for this purpose. The light transparent conducting layer 28 serves as a signal plate. It can be made of a very thin light transparent layer of a conductive metal or of any other transparent and conductive material. The image of the examined part is focused on the photocathode 27 and produces changes in its conductivity according to the pattern of the light image. The photocathode is scanned by electron beam 31 from the electron gun 32. The electron gun is well known in the art and therefore does not need any further description. The scanning electron beam may be of a high velocity such as applied in the iconoscope or of a low velocity. A low velocity scanning beam 31 is used in this embodiment of the invention and is controlled by the deflection yoke 41. A uniform magnetic or electrostatic field 42 is used to focus the scanning beam. The scanning beam striking the photoconductive layer 29 deposits electrons thereon and charges it to the potential of the cathode of the electron gun. The signal plate layer 28 is charged positively from an extraneous source of electrical power 30. The resistance of the photoconductive layer is great enough to prevent passage of charges from its scanned side to the positive signal plate. If however the photoconductive layer is illuminated its resistance decreases proportionally to the intensity of the incident light and the time of illumination. This makes possible the flow of charges through the photoconductive layer and the scanned side of said layer becomes between successive scans 1–2 volts positive in relation to the potential of the cathode of the electron gun. During the next scan the electron beam neutralizes this positive charge on the photoconductive layer and produces thereby a video signal which flows through the signal plate layer 28 over resistance to the amplifiers 36. The amplified video signals are sent by coaxial cable or by high frequency waves to the receiver of kinescope type 37 or facsimile type in which they are reconverted into visible images. In a close proximity to the scanned side of the photoconductive layer is disposed a mesh screen 30a which serves to provide a uniform field in front of the photocathode 27. Transmission of the image from the amplifier 36 to the viewing tube can be done by coaxial cable 35 or high frequency waves. The image can be sent therefore not only to the immediate, but also to the remote receivers or maybe transmitted to multiple independent viewing tubes for the benefit of many examiners which was one of the objectives of this invention.

The potential for the photocathode is provided by a source of electrical power situated outside of the examined body also by means of the flexible electrical wires. In the same way the horizontal and vertical synchronizing circuits, focusing rings and deflecting circuits are supplied with electrical energy from an outside source. The sources of the electrical power are of high frequency so that the danger of shock is eliminated in case should the insulation of cables fail. The synchronizing 41a and deflecting circuits 41 and focusing coils 42 are not described in detail as they are well known in the art.

By means of this invention the examination of the internal organs of the patient is not dependent any more on their shape. The image of the examined organ 2a can be transmitted to the viewing tube 37 irrespective of the curve of the organ as the reception of the image does not require any more the maintenance of straight line between the eye of the examiner and the examined part which was a necessity in all present endoscopic instruments. In this way hitherto inaccessible parts of the body will be open for diagnostic purposes which was the main objective of this invention. The image 37a on the viewing tube 37 may be photographed simultaneously with the endoscopic examination in order to make a permanent record which was another purpose of this invention.

In some organs, such as, for example, in the stomach, the examined part has to be distended by air insufflation prior to the examination. A special air pump attachment 44 is provided for this purpose. The knob 45 on the handle 1 serves to indicate to the examiner the position of windows 12 and 18 in the flexible part of the endoscope.

In case a true color image of the examined organ is wanted, a mechanically driven rotating color wheel 50 composed of three basic chromatic filters 51, 52 and 53 is placed before the television pick-up tube 16, see Figures 4 and 6a. A similar wheel 50a rotating synchronously with the first color wheel 50 is placed in front of the picture tube 55 in the receiver. Each examined field is scanned and reproduced in succession through a different primary color in the filter wheel. Therefore three colored images, red, green and blue are projected on the final viewing screen 56 in 1/40 second. The persistence of vision lasts longer than 1/40 of a second therefore these three color images fuse in the mind of the observer and a multi-colored reproduction 57 corresponding to the true colors of the examined organ results. The color wheels 50 and 50a are driven by induction motor 58, synchronized by synchronization stage which compares the incoming pulses with locally generated ones and thereby controls the speed and the phase of the disc. Since the color wheels synchronization is obtained from the video-wave form, the phasing of the color filters is automatically selected, that is a given color automatically appears before the receiver tube when that color is present before the pick-up tube.

The illuminating system consisting of electrical bulb 7 and lens 11 in this modification of endoscope is the same as described above and shown in Fig. 1. The mounting of the illuminating system also is the same as shown in Fig. 1. The optical system 15 is essentially the same as described above and shown in Fig. 1. In some cases additional lenses 21a may be used between the rotating wheel 50 and the television pick-up tube 16 for a better focusing of the image of the examined part on the photocathode of the pick-up tube 16. The mounting of the optical system is the same as shown in Fig. 1. The rotating color wheel 50 in front of the television pick-up tube is mounted on the bracket 59 which is attached to the inner wall of the mounting of the optical system. The rotating wheel is activated by the synchronous motor 58 situated outside of the examined part of the body and connected to the wheel by means of the flexible insulated cable 59a. The television pick-up tube 16 is the same as shown in Figs. 1 and 2 and is mounted in the rigid housing box 14 in the same manner as described above.

The image of the examined part of the body is projected by the optical system onto the photocathode of the television pick-up tube through the rotating multicolor wheel 50 and is converted by said television pick-up tube into video signals having the pattern of the examined part in the same way as was explained above. The video signals are transmitted by the flexible coaxial cable 35 to the amplifiers 36 outside of the examined body. The amplified video signals are conducted by the coaxial cable 35a to the viewing tube 55 of the kinescope type. The video signals modulate the scanning beam 60 of the kinescope 55. The modulated scanning beam in the kinescope striking the fluorescent screen 61 of the kinescope is reproducing the images of the examined part. These images are projected through the color wheel 50a rotating synchronously with the similar color wheel 50 in front of the pick-up tube. In this way three colored images of the examined part are projected on the final screen 56 in 1/40 of the second, blending thereby into one multicolored image due to persistence of the vision of the observer. The resulting multi-colored images 57 can be visually examined on the screen 56 or may be recorded.

The multicolor rotating wheel is shown in front view in Fig. 6a. It has three sections of colored glass corresponding to three basic chromatic values such as red 51, blue 52 and green 53.

Another modification of my invention is shown in Fig. 5. This form of the invention is specially suitable for the examination of organs having a smaller inner diameter, in which case the maximum degree of miniaturization of the endoscope is necessary. This modification of the endoscope consists of a rigid part 65, flexible part 66 and semiflexible tip 67. The mechanical construction of these parts is the same as described above and does not have to be repeated. The internal structures of the flexible part 66 are completely different. In particular the illuminating system is replaced in this modification by the flying spot kinescope. The miniature flying spot kinescope 68 is shown in Fig. 6 and is a vacuum tube provided with an electron gun 69 producing a fine beam of electrons 69a, with circuits 70 for deflecting said electron beam in two mutually perpendicular directions and a screen 74 coated with a fluorescent material. The electron gun consists of an electron emission source 75 and an electron-optical system to focus the electrons into a fine beam. The electron optical system has also means 76 to control the intensity of the current of said electron beam. The electron-optical system may consist of magnetic and electrostatic lenses combined. The first lens 77 is very close to the cathode, is of electrostatic type and acts to compress the emitted electron beam into a narrow bundle called cross-over. The cross-over is imaged by the second lens 78 which may be of electrostatic or magnetic type on the fluorescent screen 74. The cathode may be of thermionic type. Thoriated tungsten or barium and strontium oxide are suitable materials for this type of the cathode. The cathode is heated indirectly by the tungsten heater 79. The fluorescent screen of the kinescope must be of a phosphor of a very short persistence in order to obtain a good resolution of image. ZnO phosphor has decay time of one microsecond and is suitable therefore for this purpose. Still better results will be obtained by applying ZnS phosphor and utilizing only the ultraviolet component of its fluorescent emission which has the decay time of 1/10 microsecond. The electron beam of the kinescope has to scan the fluorescent screen in a predetermined pattern. This scanning motion of the electron beam is obtained by the electrostatic or magnetic fields which produce deflection of said beam. Two fields at the right angle to the axis of the electron gun are used. They are provided by the deflection yoke 70 consisting of two pairs of deflecting coils slipped over the neck of the tube. One deflecting field is produced by the horizontal deflection coil and has line frequency i. e. 15750 cycles/sec. Another deflecting field is produced by the vertical deflection coil and has field frequency, i. e. 60 cycles/sec. In this way the electron beam is made to move in across the screen and to return to its original position. The source of the deflection fields is the synchonizing generator 80 which produces saw-tooth wave signals. The effect of applying these two saw-tooth currents to the deflecting coils is to have the electron beam in the kinescope to describe series of horizontal lines on the fluorescent screen producing the standard scanning pattern.

The light produced by the kinescope is projected by means of the objective prism 81 on the examined part. The light reflected from the examined part is gathered by the prism 82 and by the condenser prism system 83 and is projected onto photocathode 84 of the photocell 85. The kinescope 68, the optical system and the photocell 85 are placed in the rigid non-transparent housing unit 86. A non-transparent partition 87 separates the flying spot kinescope from the optical system in order to prevent the stray light from reaching the photocell. The kinescope tube is held in the housing by means of the socket 68a mounted in the inner wall of the housing. The socket is supplied with multiple flexible wire leads 88 connecting it with the outside source of electrical power 89. The objective prism 81 for the kinescope is attached to the inner wall of the housing by means of bracket 81a. The optical system consists of 90° gable prism of Amici 82 and of condenser lens 83. This prism is designed not only to pick-up the light rays reflected from the walls of the examined organ and to refract them to the condenser lens 83 but also to rotate the image to the correct side, i. e. objects to the right of the objective will appear to the right in the visual field. The prism and the lens are mounted in the cylindrical bracket which is threaded. The bracket is screwed to the inner wall of the housing box 86. The photocell 85 is attached to the inner wall of the housing by means of the socket into which it is plugged in, or may be supported by brackets 85a.

The photocell is supplied with flexible wire lead 90 connecting it with the source of electrical power 91 located outside of the examined body, which provides various voltages necessary for operation of the photocell.

The housing box 86 has the light transparent window 92 to transmit the light from the kinescope to the examined organ and another light transparent window 93 on the other side of the partition which serves to admit the reflected light from the examined organ. These windows are correlated with windows 92a and 93a in the flexible part of the endoscope provided with transparent glass, so that the illumination may be transmitted to the examined part and the image of the examined part may be admitted to the prism 82. The light signals produced by the flying spot of the kinescope can therefore be projected by the objective lens onto the examined part. The light signals reflected from the examined part can be gathered by the optical system and projected onto the photocell. The housing 86 is attached to the inner walls 66a of the flexible part 66 of the endoscope by means of brackets 94 and threaded tube 95. The brackets are soldered or welded to the inner walls of the endoscope so that the housing box maintains the proper position in the endoscope. These brackets support the tube 95 which is threaded in its inner diameter. The housing 86 is threaded in its outer diameter and is screwed into the tube 95. Two additional support brackets 94a are provided to hold the tube 96 into which the housing slides in and rests therein.

The photocell 85 may be of photovoltaic or photoconductive type and it is understood that any type of photocell falls within the scope of this invention. In the preferred form of the invention a photoconductive photocell 85 having the light sensitive element such as of germanium or selenium is used. Many sulphides and selenides are suitable for this purpose. The photoconductive cell 85 consists of a photoconducting element in form of a wafer 84, of a peripheral electrode 100 and of a whiskey type of collector 99. The collector is biased negatively with respect to the peripheral contact through a suitable resistance from a source of electrical power such as battery 91 situated outside of the body and connected to the photocell by means of flexible electrical cable 90. The peripheral electrode is connected to the ground. The light falling on one side of a thin wafer of germanium 84 controls the flow of current in the collector wire 99. Therefore, all point images produced by the flying spot scanning illumination of the examined body are converted by the photoconductive photocell 85 into fluctuations of the electrical current and then over a suitable resistance into video signals.

In an alternative form of this invention a photovoltaic type of photocell is used. The photovoltaic photocell is shown in Fig. 3 and consists of light sensitive selenide or Cu₂O layer 176 of a light transparent conducting layer such as of silver 177 and of a conducting base such as of iron 175. The light falling on the light sensitive selenide changes its resistance and makes possible the passage of current from the battery. At the same time this photocell generates its own voltage which may be converted into video signals. The video signals 101 having the pattern of the examined part are transmitted by means of the flexible coaxial cable 102 to the amplifiers 103 outside of the examined body. The amplified video signals are conducted by the coaxial cable 102a to the projecting kinescope 104 located also outside of the examined body. The amplified video signals are applied to the grid of said projecting kinescope and modulate the intensity of its electron beam. The modulated electron beam reproduces the image of the examined part on the fluorescent screen where it may be visually examined or recorded. The operation of projection kinescope was described above and is well known in the art. In some instances video signals produced by the semi-conducting photocell are strong enough so that no further amplification of signals is necessary.

The high voltage necessary for operation of the flying spot kinescope is obtained from power supply 89 situated outside of the examined body. The power supply for the photocell is provided by the battery 91. The elastic flexible insulated cables 88 and 90 connect sources of electrical power with the kinescope and the photocell and provide the necessary energy for their operation. Instead of flexible cables 88 and 90 printed circuits may be used within the endoscope in order to further reduce its size. The synchronizing and deflecting circuits for the flying spot kinescope and for the projection kinescope are not shown in detail as they are well known in the art.

In case a true color image of the examined organ is wanted, three photocells are needed.

In this modification of my invention, see Fig. 7, the handle 120 is a rigid tube of diameters corresponding to the examined part 2a and serves to move the endoscope into a desired direction. At the end of the handle begins the flexible part 121 of the endoscope which also has the width and length appropriate for the size of the organ being investigated. The flexible part 121 of the endoscope is made of the stainless steel spiral sheet 148 described above. The spiral is covered with various layers of rubber tubing 149, 149a and 149b which also were described previously. At the end of the flexible part there is a semi-flexible tip 122 which is screwed onto the flexible part by means of threads and can be easily removed giving access to the inner structure of the endoscope. The tip consists of a solid conical rubber finger which facilitates gliding of the endoscope within the examined organ. In the distal end of the flexible part of the endoscope there is a rigid non-transparent housing box 125 containing the illumination system in the form of a miniature flying spot kinescope 119.

The box 125 is attached to the inner walls of the endoscope by means of the brackets 126 and the threaded tube 126a, and is held in position in the similar manner as described previously in Fig. 5. The housing box is provided with the window 127 for transmission of the light produced by the flying spot of the kinescope. Opposite window 127 there is in the wall of the flexible part of the endoscope glass window 127a which allows the light from the kinescope to illuminate the examined part.

The kinescope 119 is mounted in the rigid non-transparent housing box 125 by means of a socket 119a. The kinescope is plugged into the socket. It is advantageous to use the objective prism 128 between the screen of the kinescope 119 and window 127 in order to concentrate the light on one field. The kinescope is activated by the source of electrical power 129 situated outside of the examined body. The flexible electrical cable 130 leads from the socket 119a to said outside source of electrical current 129. This cable is a lacquered double insulated electric wire, is covered with liquid rubber and is vulcanized in order to prevent a short circuit.

The operation of the flying spot kinescope was described in detail above and illustrated in Fig. 6.

The fluorescent screen of the kinescope must be of a phosphor of a very short persistence in order to obtain a good resolution of image. ZnO phosphor has decay time of 1 microsecond and is suitable therefore for this purpose. Still better results will be obtained applying ZnS phosphor and utilizing only the ultraviolet component of its fluorescent emission which has the decay time of $\frac{1}{10}$ microsecond.

The non-transparent partition 118 in the housing box 125 separates the compartment housing the kinescope 119 from the compartment 131 containing the optical system 136 and three photocells 137, 138, and 139. The compartment 131 has an opening 140 provided with transparent glass 140a which serves to admit the image of the examined part. This opening is correlated with window 141 in the flexible part of the endoscope which is also provided with transparent glass 142 and which transmits the image of the examined part. The optical system 136 consists of 90° gable prism of Amici 143, condenser lenses 144 and dichroic mirrors 145 and 146. This prism is designed not only to pick up the light rays reflected from the walls of the examined organ and to refract them to the condenser lens and dichroic mirrors, but also to rotate the image to the correct side, i. e. objects to the right of the objective will appear to the right in the visual field. The prism 143, the lens 144 are mounted in the cylindrical bracket 147 which is threaded. The bracket is screwed onto the inner walls of the housing box 125.

The housing compartment 131 contains also three miniature photocells 137, 138 and 139.

The photocells are attached to the inner walls of the housing by means of sockets or brackets 137a, 138a and 139a. Each bracket is supplied with the multiple wire flexible cable 153, 154 and 155. These cables connect each socket with the outside source of electrical power 156. The light signals produced by the flying spot of the kinescope 119 are projected by the objective prism 128 onto the examined part. The light signals reflected from the examined part are gathered by the optical system 136 and projected through the crossed dichroic mirrors 145 and 146 onto photocells, 137, 138 and 139. The photocells 137, 138, and 139 may be of photoconductive or photovoltaic type described above. In the preferred embodiment of this invention photoconductive cells 137, 138 and 139 are used. Each photocell consists of a light sensitive element 84, of a peripheral electrode 100 and of a whisker type collector 99. The light sensitive element may be of germanium, or selenium. Many sulphides and selenides are suitable for this purpose. The light falling on one side of a thin wafer of germanium 84 controls the flow of the current in the collector wire 99. Therefore all point images produced by the flying spot scanning illumination of the examined body can be converted by the photo-conductive photocells over a suitable resistance into video signals.

The dichroic mirrors are of the quarter wave dielectric-film type. This type of mirror is made by evaporation of alternate layers of insulators with high and low index of refraction of predetermined thickness on glass. The dichroic mirrors can be arranged in many different ways which are obvious to those skilled in the art. Due to the fact that dichroic mirrors do not always have the ideal spectral response for the three basic chromatic components of the picture, thin absorption filters may be added in front of the photocells in order to improve upon color selectivity of the dichroic mirrors. The dichroic mirrors 145 and 146 are supported by the brackets 147a attached to the inner wall of the housing 125. The dichroic mirrors split the white light by allowing only certain wave lengths to pass through them while reflecting all other wave lengths. In this case the photocell 137 will be reached only by the red light, the photocell 138 only by the green light, and the photocell 139 only by the bue light. The light signals from the examined part projected by optical system 136 on the photosentive element of said three photocells are converted therein into video signals as explained above.

The video signals from each of three photocells are transmitted simultaneously by means of the flexible coaxial cables 150, 151 and 152 to three amplifiers 158, 159 and 160 outside of the examined body. The amplifiers must be of equalizing type in order to bring about correction for the decay of phosphor of the flying spot kinescope. Furthermore, the amplifier must be non-linear in order to maintain over all gamma of unity in the system. The amplifiers therefore for each basic chromatic component of the picture must have characteristic reciprocal to that of the flying spot kinescope. In some instances, video signals produced by semiconducting photocells are strong enough so that no further amplification of signals is necessary.

The amplified video signals are conducted by the coaxial cables 150a, 151a and 152a to three projecting kinescopes 162, 163 and 164 located also outside of the examined body.

The projection kinescopes are identical except that their phosphors are selected for producing red, green and blue lights respectively. Each kinescope is provided with the video signals from one photocell corresponding to the particular color of its phosphor fluorescence.

It means video signals from the photocell 137 which receives red light signals are delivered only to the kinescope 162 having red phosphor screen. The signals from the photocell 138 which receives green light signals are delivered only to the kinescope 163 having phoshpor screen emitting green light. The signals from the photocell 139 which receives blue light signals are delivered only to the kinescope 164 which has blue light emitting phosphor screen. The amplified video signals from each photocell are applied to the grid of the corresponding projecting kinescope and modulate the intensity of its electron beam. The modulated electron beam reproduces the image of the examined part on the fluorescent screen of its kinescope. Each kinescope has its own projection lens. The lenses 165, 166 and 167 project these three color pictures produced by three kinescopes simultaneously on the viewing screen 168. In this way the final image 169 appears on the viewing screen in colors corresponding to the examined organ.

Each projection kinescope has its own deflection yoke. All yokes 170, 171, 172 are identical. The synchronizing and deflecting circuits are not shown in order not to complicate the drawings as they are well known in the art.

The high voltages necessary for operation of the flying spot kinescope and projection kinescopes are obtained from radio frequency power supply 129 situated outside of the examined body. The elastic flexible insulated cables connect said source of power supply with the kinescope and provide the necessary potentials for its operation. Instead of flexible cables, printed circuits may be used within the endoscope, in order to reduce its size further. The voltage sources may be of radio frequency which eliminates the danger of electrical shock in case of the breakdown of insulation. The electrical power for photocells is provided by battery 156 and is connected by cables 153, 154 and 155.

Instead of multiple projection kinescopes, a single viewing tube with a composite viewing screen having three basic colors phosphors may be used. Many various projection kinescopes for reproduction of color images are known in the art and it is to be understood that all different forms of said kinescopes may be used in this invention.

The intensification of a final image of the examined internal parts is provided by the amplifiers 36, 103 or 158. The changes in the contrast of the final image of the examined internal part are also obtained by the use of amplifiers. In such cases variable mu amplifiers are suitable for this purpose.

It should be understood that the term "illumination" and "light" used herein and in the appended claims may include visible and invisible light.

What is claimed is:

1. A device for examination of an internal portion of a human body, which portion has a tortuous configuration and an irregular inner surface and exhibits, during examination, variations of its configuration and shape, said device consisting essentially of a source of illumination whereby the wall of said internal portion is illuminated and an image of said internal portion is produced, image sensitive means disposed in said device for receiving said image, means for directing said image to said image sensitive means, said image sensitive means having a vacuum tube provided with a composite screen comprising an electrically conducting layer adapted to be connected to the source of electrical potential and a photoconductive layer, said image sensitive means having furthermore means for converting said image into electrical signals, and elongated housing means having a flexible part, said housing means supporting said source of illumination, said image sensitive means and said image-directing means, and adapted in size and shape for introducing said device into said internal portion, the wall of said flexible part of said housing means having elasticity to conform to the configuration and to the shape of said internal portion to prevent thereby the injury to said internal portion, and means connected to said image sensitive means for transmitting said electrical signals to the exterior of said body.

2. A device for examination of an internal portion of a human body, which portion has a tortuous configuration and an irregular inner surface and exhibits, during examination, variations of its configuration and shape, said device consisting essentially of a source of illumination whereby the wall of said internal portion is illuminated and an image of said internal portion is produced, image sensitive means disposed in said device for receiving said image, means for directing said image to said image sensitive means, said image sensitive means having a vacuum tube provided with a pheotocathode within said tube, said photocathode comprising an electrically conducting layer connected to the source of electrical potential and a photoconductive layer adapted to be, and provided furthermore with means for producing an electron beam, said image sensitive means having furthermore means for converting said image into electrical signals, and elongated housing means having a flexible part, said housing means supporting said source of illumination, said image sensitive means and said image directing means, and adapted in size and shape for introducing said device into said internal portion, the wall of said flexible part of said housing means having elasticity to conform to the configuration and to the shape of said internal portion to prevent thereby injury to said internal portion, and means connected to said image sensitive means for transmitting said electrical signals to the exterior of said body.

3. A device for examination of the gastro-intestinal tract of the human body, which tract has a tortuous configuration and exhibits peristaltic motion varying thereby its configuration and shape, said device consisting essentially of a source of illumination whereby the wall of the examined portion is illuminated and an image of said portion is produced, a vacuum tube, means for directing said image to said tube, said vacuum tube being provided with a composite screen comprising a light transparent electrically conducting layer adapted to be connected to the source of electrical potential and a photoconductive layer, and for converting said image into an electrical pattern corresponding to said image, said tube furthermore comprising means converting said electrical pattern into electrical signals, elongated housing means having a flexible part, said housing means supporting said source of illumination, said vacuum tube and said image-directing means, adapted in size and shape for introducing said device into said examined portion, said housing means having furthermore a first window transmitting the light from said source of illumination to said examined portion and a second window admitting the light reflected by said examined portion, the walls of said flexible part of said housing means conforming to configuration and shape of said gastro-intestinal tract, and means connected to said vacuum tube for transmitting said electrical signals to the exterior of said body.

4. A device for examination of an internal portion of a human body, which portion has a tortuous configuration and an irregular inner surface and exhibits during examination, variations of its configuration and shape, said device consisting essentially of a source of illumination whereby the wall of said internal portion is illuminated and an image of said portion is produced, image sensitive means, means for producing plural color images of said internal portion, means for directing said color images to said image sensitive means, said image sensitive means having a vacuum tube provided with a photocathode within said tube, said photocathode comprising a light transparent electrically conducting layer adapted to be connected to the source of electrical potential and a photoconductive layer, said image sensitive means having furthermore means for converting said image into electrical signals, elongated housing means having a flexible part, said housing means supporting all the aforesaid elements and being adapted in size and shape for introducing into said internal portion, the wall of said flexible part of said housing means having elasticity to conform to configuration and shape of said internal portion to prevent thereby injury to said internal portion, and means connected to said image sensitive means for transmitting said electrical signals to the exterior of said body.

5. A device for examination of an internal portion of a human body, which portion has a tortuous configuration and an irregular inner surface and exhibits during examination, variations of its configuration and shape, said device consisting essentially of a source of illumination whereby the wall of said internal portion is illuminated and an image of said portion is produced, image sensitive means, means for producing plural color images of said internal portion, means for directing said color images to said image sensitive means, said image sensitive means having a vacuum tube provided with a photocathode within said tube, said photocathode comprising an electrically conducting layer adapted to be connected to the source of electrical potential and a photo-conductive layer, and provided furthermore with means for producing an electron beam, said image sensitive means having furthermore means for converting said image into electrical signals, elongated housing means having a flexible part, said housing means supporting all the aforesaid elements and being adapted in size and shape for introducing into said internal portion, the wall of said flexible part of said housing means having elasticity to conform to configuration and shape of said internal portion to prevent thereby injury to said internal portion, and means connected to said image sensitive means for transmitting said electrical signals to the exterior of said body.

6. A device for examination of an internal portion of a human body, which portion has a tortuous configuration and irregular shape, said device comprising in combination a source of illumination whereby the wall of said portion is illuminated and image of said portion is produced, a vacuum tube, means for directing said image to said tube, said vacuum tube being provided with a photocathode, said photocathode comprising a light transparent electrically conducting layer adapted to be connected to the source of electrical potential and a photoconductive layer having one surface uncovered, said tube being provided furthermore with means for converting said image into electrical signals, elongated housing means having a flexible part, said housing means supporting said source of illumination, said vacuum tube and said image-directing means, being adapted in size and shape to be introduced into said internal portion, the wall of said flexible part of said housing means having elasticity to conform to configuration and shape of said internal portion to prevent thereby injury to said internal portion, said housing means having furthermore means separating said source of illumination and said vacuum tube whereby only light reflected by said internal portion is admitted to said vacuum tube, and means connected to said tube for transmitting said electrical signals to the exterior of said body.

7. A device for examination of an internal portion of a human body, which portion has a tortuous configuration and exhibits during examination variations of its configuration and shape, said device comprising in combination a source of illumination whereby the wall of said internal portion is illuminated and an image of said portion is produced, image sensitive means having a vacuum tube provided with a photocathode, said photocathode comprising a light transparent electrically conducting layer adapted to be connected to the source of electrical potential and a photoconductive layer, said vacuum tube being disposed in said device, means for directing said image of said internal portion to said vacuum tube, said vacuum tube producing in response to said image an electrical pattern having at least two dimensions corresponding to said image, and being provided furthermore with means for converting said electrical pattern into electrical signals, elongated housing means supporting said source of illumination, said image sensitive means and said image-directing means, being adapted in size and shape to be introduced into said internal portion, said housing means having a first window transmitting the light from said source of illumination to said internal portion and a second window for admitting the light reflected by said internal portion, said housing means having furthermore means separating said source of illumination and said image sensitive means whereby only light reflected by said internal portion is admitted to said image sensitive means, and means connected to said device for transmitting said electrical signals representing said image to the exterior of said body.

References Cited in the file of this patent

UNITED STATES PATENTS

| Number | Name | Date |
|---|---|---|
| 1,965,103 | Kitroser | July 3, 1934 |
| 2,021,907 | Zworykin | Nov. 26, 1935 |
| 2,215,365 | Vestergren | Sept. 17, 1940 |
| 2,234,806 | Ploke | Mar. 11, 1941 |
| 2,236,842 | Allyn | Apr. 1, 1941 |
| 2,280,561 | Wappler | Apr. 21, 1942 |
| 2,335,180 | Goldsmith | Nov. 23, 1943 |
| 2,349,932 | Back | May 30, 1944 |
| 2,378,746 | Beers | June 19, 1945 |
| 2,389,645 | Sleeper | Nov. 27, 1945 |
| 2,433,971 | Adams | Jan. 6, 1948 |
| 2,516,132 | Marcouiller | July 25, 1950 |
| 2,593,925 | Sheldon | Apr. 22, 1952 |
| 2,595,553 | Weimer | May 6, 1952 |
| 2,632,801 | Donaldson | Mar. 24, 1953 |
| 2,649,500 | Fedorchak | Aug. 18, 1953 |

FOREIGN PATENTS

| Number | Country | Date |
|---|---|---|
| 526,643 | Germany | June 8, 1931 |
| 604,198 | Great Britain | June 30, 1948 |
| 728,187 | Germany | Nov. 21, 1942 |
| 885,770 | Germany | Aug. 6, 1953 |